United States Patent
Sun et al.

(10) Patent No.: US 12,206,728 B1
(45) Date of Patent: Jan. 21, 2025

(54) MULTI-CLOUD ACTIVE MESH NETWORK SYSTEM AND METHOD

(71) Applicant: AVIATRIX SYSTEMS, INC., Santa Clara, CA (US)

(72) Inventors: Yixin Sun, San Ramon, CA (US); Shanshan Xu, Fremont, CA (US); Colby Wen, Pleasanton, CA (US); Xiaobo Sherry Wei, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 143 days.

(21) Appl. No.: 17/332,994

(22) Filed: May 27, 2021

(51) Int. Cl.
*H04L 67/10* (2022.01)
*H04L 45/00* (2022.01)
*H04L 45/12* (2022.01)

(52) U.S. Cl.
CPC ............ *H04L 67/10* (2013.01); *H04L 45/123* (2013.01); *H04L 45/22* (2013.01)

(58) Field of Classification Search
CPC ........ H04L 67/10; H04L 45/123; H04L 45/22
USPC ....................................................... 709/238
See application file for complete search history.

(56) References Cited

U.S. PATENT DOCUMENTS

| | | | |
|---|---|---|---|
| 8,874,755 B1 | 10/2014 | Deklich et al. | |
| 9,455,959 B1 | 9/2016 | Garg et al. | |
| 10,027,587 B1 * | 7/2018 | O'Brien | H04L 69/22 |
| 10,491,466 B1 | 11/2019 | Hira et al. | |
| 10,567,270 B1 * | 2/2020 | Boyapati | H04L 45/122 |
| 11,075,827 B1 * | 7/2021 | Nayak | H04L 41/0895 |
| 11,252,126 B1 * | 2/2022 | Thunga | H04L 45/48 |
| 11,388,227 B1 | 7/2022 | Sun et al. | |
| 2005/0074015 A1 | 4/2005 | Chari et al. | |
| 2010/0125903 A1 | 5/2010 | Devarajan et al. | |
| 2010/0306572 A1 | 12/2010 | Salvarani et al. | |
| 2012/0008503 A1 | 1/2012 | Qiu et al. | |

(Continued)

FOREIGN PATENT DOCUMENTS

GB 2551792 A 1/2018

OTHER PUBLICATIONS

U.S. Appl. No. 17/079,399, filed Oct. 23, 2020 Non-Final Office Action dated Apr. 13, 2022.

(Continued)

*Primary Examiner* — Cheikh T Ndiaye
*Assistant Examiner* — Ayele F Woldemariam
(74) *Attorney, Agent, or Firm* — Winstead PC (57) ABSTRACT

In one embodiment, a controller features a first data store, a second data store and route determination logic. The first data store is configured to store current routing information from a source transit gateway within at least a first transit cloud network to a destination transit gateway within at least a second transit cloud network of the cloud network. Each of the source transit gateway and the destination transit gateway being one of a plurality of transit gateways associated with the cloud network. The second data store is configured to store alternative routing information between the source transit gateway and the destination transit gateway. The route determination logic is configured to (i) conduct analytics on all available route paths for a message intended to be sent from the source transit gateway to the destination transit gateway and (ii) select a best route path for the message.

19 Claims, 6 Drawing Sheets

(56) References Cited

U.S. PATENT DOCUMENTS

| | | | |
|---|---|---|---|
| 2013/0286846 A1 | 10/2013 | Atlas et al. | |
| 2018/0062880 A1* | 3/2018 | Yu | H04L 63/20 |
| 2018/0069716 A1 | 3/2018 | Bhat et al. | |
| 2018/0083859 A1 | 3/2018 | Barnum et al. | |
| 2018/0176073 A1 | 6/2018 | Dubey et al. | |
| 2018/0227212 A1* | 8/2018 | Ferguson | H04L 45/122 |
| 2019/0097940 A1* | 3/2019 | Cheng | H04L 12/4641 |
| 2019/0158605 A1 | 5/2019 | Markuze et al. | |
| 2019/0280927 A1 | 9/2019 | Filsfils et al. | |
| 2020/0067734 A1 | 2/2020 | Hira et al. | |
| 2020/0092194 A1 | 3/2020 | Tillotson et al. | |
| 2020/0288386 A1 | 9/2020 | Glazemakers et al. | |
| 2020/0336420 A1 | 10/2020 | Joshi et al. | |
| 2020/0358693 A1* | 11/2020 | Rawlins | H04L 12/4641 |
| 2021/0036889 A1 | 2/2021 | Jain et al. | |
| 2021/0044512 A1 | 2/2021 | Deb et al. | |
| 2021/0083967 A1 | 3/2021 | Joshi et al. | |
| 2021/0168056 A1 | 6/2021 | Qian et al. | |
| 2021/0218598 A1 | 7/2021 | Ganapathy et al. | |
| 2021/0328891 A1 | 10/2021 | Cherkas | |
| 2022/0210053 A1* | 6/2022 | Du | H04L 45/12 |

OTHER PUBLICATIONS

U.S. Appl. No. 17/186,911, filed Feb. 26, 2021 Non-Final Office Action dated Sep. 8, 2021.

Bhamare, et al., "Multi-Cloud Distribution of Virtual Functions and Dynamic Service Deployment: OpenADN Perspective." IEEE, 2015 Retrieved from URL: http//citeseerx.ist.psb.edu/viewdoc/download. 2015.

PCT/US2022/016196 filed Feb. 11, 2022 International Search Report and Written Opinion dated Jun. 2, 2022.

U.S. Appl. No. 17/186,911, filed Feb. 26, 2021 Notice of Allowance dated Mar. 9, 2022.

* cited by examiner

MULTI-CLOUD ACTIVE MESH NETWORK SYSTEM AND METHOD

CROSS-REFERENCE TO RELATED APPLICATIONS

This application is related to continuation-in-part of U.S. patent application Ser. No. 17/186,911 filed Feb. 26, 2021 and U.S. patent application Ser. No. 17/079,399 filed Oct. 23, 2020, the entire contents of both of which are incorporated by reference herein.

FIELD

Embodiments of the disclosure relate to the field of networking. More specifically, one embodiment of the disclosure relates to a full-mesh network architecture configured to mitigate communication disruptions through alternative route maintenance and selection, especially between transit cloud networks within different public cloud networks.

GENERAL BACKGROUND

Over the past few years, cloud computing has provided an Infrastructure as a Service (IaaS), where resources are provided as part of a public cloud network and made accessible as a service to organizations as well as the persons associated with these organizations such as administrators, employees, contractors, or the like (hereinafter, "users"). One of these services allows users to run software components (e.g., software instances such as virtual servers) within the public cloud network. Hence, the migration of software functionality into the public cloud network has led to greater usage of virtual private networks deployed within the public cloud network.

A virtual private network is a collection of virtual components operating as an on-demand, configurable pool of resources, which include resources at least partially allocated from the public cloud network and provides a certain level of isolation between different users. The isolation between different users of the same public cloud network may be achieved through access controls and allocation of the virtual components on a per user basis. For example, Amazon® Web Services (AWS®) provides for the purchase of Amazon® Elastic Compute Cloud (EC2) services, which provide dedicated data processing capabilities for the purchasing user.

Currently, public cloud networks support connectivity of virtual private networks within their respective network. Such connectivity, sometimes referred to as "peering," constitutes an establishment of peer-to-peer communications between separate virtual private networks for the purpose of routing data traffic as requested. Current peer-to-peer communications include a primary communication link and a high availability (HA) communication link, where the HA communication link is operational in response to a "failover" condition. More specifically, the communications between a gateway deployed within a virtual private network and either (i) a gateway of another virtual private network or (ii) an on-premises computing device such as a router controlling communications within an on-premises network are accomplished by the primary communication link placed in an "active" state. The HA communication link is initially set to a "standby" (inactive) state, but it is switched to an "active" state when the primary communication link fails. However, this virtual private network "failover" communication scheme suffers from a number of disadvantages.

One disadvantage associated with this conventional failover communication scheme is that the standby communication link constitutes an inefficient use of allocated resources because the standby communication link is never used until a failover event happens. Also, this conventional failover communication scheme does not monitor or maintain alternate route paths for communications between virtual components (e.g., transit gateways described below), such as between transit gateways deployed as different virtual private networks within the same or different public cloud network. Herein, the term "virtual private network" may include, but is not limited or restricted to (i) a virtual private cloud network provided by Amazon® AWS public cloud network or by Google® Cloud, (ii) a virtual network (VNet) provided by Microsoft® Azure public cloud network, or the like.

Additionally, for the failover communication scheme, the gateway routing table for each gateway is updated based on the router environment, without consideration of the entire cloud system architecture utilized by the user. This router-centric path management adversely effects convergence (stabilization) of the entire cloud system. Furthermore, router-centric path management is less effective in avoiding disruption of data communications between virtual private networks within a public cloud network or between multiple public cloud networks, which has become a necessity as more companies migrate their networking operations to public cloud networks.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of a system and method for establishing a full-mesh, multi-cloud network with multiple virtual private networks spanning across multiple public cloud networks, where the full-mesh network mitigates disruption of communications directed to or from virtual private networks due to communication link failures. The full-mesh network features a plurality of cloud-based networking infrastructures responsible for the transmission of messages between virtual private networks responsible for routing of messages (hereinafter, "transit cloud networks"), which may be deployed within the same public cloud network or different public cloud networks. The transit cloud networks may include one or more virtual private cloud networks (VPCs), which may be implemented as part of Amazon® Web Services (AWS) public cloud network or as part of Google® Cloud (hereinafter, "transit VPCs"). Additionally, or in the alternative, the transit cloud networks may include one or more virtual networks (VNets) implemented as part of Microsoft® Azure® public cloud network.

Herein, for illustrative purposes, the full-mesh network may include one or more virtual private networks (hereinafter, "spoke cloud network"), which is communicatively coupled to a transit cloud network (e.g., transit cloud network). Each spoke cloud network may include a set of gateways (e.g., two or more "spoke" gateways), which are communicatively coupled to one or more instances (e.g., cloud instances associated with a particular subnet or particular subnets as described below) and a set of gateways deployed within a transit cloud network (hereinafter, "transit gateways"). Each of the spoke gateways and transit gateways may be accessed in accordance with a unique Classless Inter-Domain Routing (CIDR) routing address to propagate messages over the full-mesh network.

Herein, the transit cloud networks may be deployed within the same public cloud network as the spoke cloud networks. As described below, the transit cloud networks are configured to control the propagation of data traffic over the full-mesh network. More specifically, according to one embodiment of the disclosure, a first transit cloud network features a one-to-many communication link deployment (e.g., criss-cross peering), where each transit gateway with the first transit cloud network supports multiple, active peer-to-peer communication links to transit gateways associated with different transit cloud network(s). These peer-to-peer communication links may constitute cryptographically secure tunnels, such as tunnels operating in accordance with a secure network protocol. One example of a secure network protocol may include, but is not limited or restricted to Internet Protocol Security (IPSec). Hence, for clarity sake, these peer-to-peer communication links may also be referred to as "IPSec tunnels."

Herein, the controller is configured to determine the "best" route paths between different transit gateways and generate alternate route paths based on alternative routing information maintained by the controller. In particular, the controller includes route determination logic, namely logic operating in accordance with Border Gateway Protocol (BGP). The route determination logic is responsible for (i) conducting analytics on all available route paths for a message intended to be sent from a transit gateway within a transit cloud network to another transit gateway within the same (or a neighboring) transit cloud network and (ii) selecting a best route path for that message. These transit gateways may include a source transit gateway (operating as part of an ingress transit cloud network) that receives a message from a first (source) spoke cloud network for re-transmission and a destination transit gateway (operating as part of an egress transit cloud network) that provides the message to a second (destination) spoke cloud network. These transit cloud networks and/or the spoke cloud networks may reside within the same public cloud network or different public cloud networks.

According to one embodiment of the disclosure, the "best" route path may constitute the optimal sequence of transit gateways that support the transmission of data traffic between a source cloud instance and a destination cloud instance. More specifically, the route path may be represented by a series of pointers that represent the intermediary transit gateways (and their routing order) responsible for routing the message transmitted from the source transit gateway to the destination transit gateway. Whether the route path constitutes the "best" route path or not may be based, at least in part, on the least number of hops (transit cloud networks) through which the message is routed. For example, the best route path may be represented by BGP autonomous system (AS) information such as an aggregate of AS values, where each AS value is uniquely assigned to a particular transit cloud network.

According to one embodiment of the disclosure, besides the route determination logic, the controller may be configured with a first data store including current routing information for each of the transit gateways (hereinafter, "routing information base"). For instance, a routing information base (RIB) for a first transit gateway may include a series of pointers, which represent the best route path provided by transit gateways with the transit cloud networks to be undertaken to route a message from the source transit cloud network to the destination transit gateway. This series of pointers may correspond to one or more AS values in the aggregate (i.e., AS path). The destination transit gateway may be represented by an IP address, which is included along with the AS path. The destination transit gateway constitutes the transit gateway along the best route path that is communicatively coupled to a spoke cloud network or on-premises network including an instance intended as a recipient of the message.

Additionally, the controller may be configured with a second data store, which may be separate from or part of the first data store. The second data store maintains alternative routing information for each transit gateway. On a periodic or aperiodic basis, the controller conducts analytics of the alternative routing information in response to failure of communication link(s) between transit cloud networks that are part of the best route path. The alternative routing information for each transit gateway may include (i) one or more AS paths, (ii) information associated with the path types (e.g., local within the same transit cloud network, remote requiring Internet access), (iii) information metrics, and/or (iv) a peer gateway IP address that identifies the destination transit gateway for the alternate route path. Herein, the information metrics associated with each alternate route path may include, but are not limited or restricted to (a) metrics directed to link parameters (e.g., metrics identifying preferences between links to a neighboring transit gateway along the alternate route path), (b) metrics directed to security (e.g., lower values assigned to encrypted links, certain security protocols over others, retention with the public cloud versus transmission over the Internet, etc.), (c) metrics directed to the work load supported by the alternate route path, and/or (d) factors associated with the neighboring IP address such as selecting a transit gateway with a lower IP address value for example, if other factors are the same. One or more metrics are analyzed by the controller in response to the controller determining that the best route path has failed and multiple alternate route paths, which are considered to be elevated as the best route path, are equivalent based on the same number of hops (transit gateways) between the ingress and egress transit cloud networks.

Herein, monitoring routing operability between the private cloud networks reserved and utilized by a particular user, the controller is configured to detect when a communication link (e.g., IPSec tunnel) fails and updates the RIBs associated with transit gateways that are part of the failed IPSec tunnel by (i) disabling (bring down) a tunnel interface (e.g., virtual tunnel interface) corresponding to the failed IPSec tunnel and (ii) selecting another IPSec tunnel to handle such communications. By disabling a virtual tunnel interface (VTI) associated with the failed IPSec tunnel, further data transmissions over the failed IPSec tunnel are prevented to mitigate data transmission loss. Instead, the messages are routed through a selected active IPSec tunnel. The disabling of the VTI may be conducted by the controller, or in the alternative, by the transit gateway without further operability by the controller.

Similarly, in response to the failed IPSec tunnel becoming operational again (i.e., the IPSec tunnel becomes active), the controller and/or transit gateway will detect the return of the tunnel interface corresponding to the newly operational IPSec tunnel. In particular, logic within the controller and/or transit gateway may detect reversion in the tunnel state (e.g., IPSec tunnel between two transit gateways is now active) and, if so, the controller may reactivate the tunnel interface (e.g., remove "disabled" tag and/or resets "active" tag) and/or recover the route path associated with the previously failed IPSec tunnel if removed from the RIB associated with the source transit gateway. This recovery of the route path may be accomplished by accessing the second data store that maintains route paths available to that transit gateway, even failed (disabled) IPSec tunnels. Thereafter, the controller may recover the route path if removed from the RIB and perhaps elevate the prior failed route path as the new "best" route path.

Route path selection via the transit gateways within each transit cloud network may be accomplished through the BGP routing strategy, namely next-hop message forwarding to a single destination is based on the most efficient (best) route that may be determined based on the number of hops and information metrics as described above. More specifically, the controller may be adapted to maintain RIBs for each transit gateway within the transit cloud networks of the full-mesh network along with maintaining alternative routing information. The alternative routing information pertains to each of the transit gateways and is relied upon by the controller for determining which route (e.g., communication link such as an IPSec tunnel) to use for propagating data traffic (e.g., messages) towards a destination (e.g., virtual tunnel interface for a destination cloud instance or computing device). For this embodiment of the disclosure, the alternative routing information includes Autonomous System (AS) paths between transit gateways that may reside within the same or different transit cloud networks that may be part of the same or different public cloud network.

Further details of the logic associated with one embodiment of the full-mesh network architecture are described below:

Instance Subnets: Multiple instance subnets may be generated in a spoke VPC so that instances forming a particular instance subnet are forwarded to a selected spoke gateway.

Routing Information Base (RIB)): A routing information base may be used to associate transit gateways with other instance subnets. Load balancing is achieved by implementing the full-mesh network, where identical, information metrics are assigned routing parameters to each of the transit gateways and a secondary tunnel is established between each peer gateway pair within the same transit cloud network. Therefore, the RIB requires no programming unless the gateway becomes disabled (i.e., goes down), where the RIB may be remapped based on the results of a 5-tuple analytics mapped to the remainder of the active transit gateways within the virtual cloud network.

Gateways: Multiple gateways are deployed in a transit cloud network, where each gateway is logic that is configured to control the flow of data traffic from instances to one or more transit cloud networks. Having similar architectures, the gateways may be identified differently based on their location/operability within a public cloud network platform. The "spoke" gateways are configured to interact with targeted instances while "transit" gateways are configured to further assist in the propagation of data traffic (e.g., one or more messages) directed to a spoke gateway within a spoke VPC or a computing device within the on-premises network.

IPSec tunnels: Secure peer-to-peer communication links established between gateways of neighboring VPCs or between gateways of a VPC and a router of an on-premises network. The peer-to-peer communication links are secured through a secure network protocol suite referred to as "Internet Protocol Security" (IPSec). With respect to the full-mesh network deployment, as an illustrative example, where a spoke VPC has "M" gateways and a neighboring (transit) VPC has N gateways, M×N IPSec tunnels are created between the spoke VPC and the transit VPC to form the full-mesh network. These IPSec tunnels are represented in gateways by tunnel state information, which is represented by VTI states.

Gateway routing: In gateway routing table, route paths between the gateway and an IP addressable destination to which the tunnel terminates (e.g., another gateway, on-prem computing device, etc.), identified by a virtual tunnel interface (VTI) for example, are programmed with routing parameters, namely identical routing weights and ECMP metrics. Given consistent metrics are assigned to the IPSec tunnels, the selected route path towards the remote network may be based on analytics conducted on certain information associated with data traffic (e.g., 5-tuple). These analytics may include conducting an analysis of the information metrics, as identified above.

I. Terminology

In the following description, certain terminology is used to describe features of the invention. In certain situations, the terms "logic" and "computing device" are representative of hardware, software or a combination thereof, which is configured to perform one or more functions. As hardware, the logic (or device) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or computing device) may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As software, the logic may operate as firmware stored in persistent storage.

The term "computerized" generally represents that any corresponding operations are conducted by hardware in combination with software.

Further to the description above, a "gateway" constitutes virtual logic or alternatively physical logic. For instance, as an illustrative example, the gateway may correspond to virtual logic in the form of a software instance that perform routing of data. As an illustrative example, the gateway may constitute a routing component for virtual private networks that is assigned a Private IP address within an IP address range associated with a VPC including the gateway. The gateway allows Cloud Service Providers (CSPs) and enterprises to enable datacenter and cloud network traffic routing between virtual and physical networks, including a public network (e.g., Internet). Alternatively, in some embodiments, the gateway may correspond to physical logic, such as an electronic device that is communicatively coupled to the network and assigned the hardware (MAC) address and IP address.

The term "cloud-based networking infrastructure" generally refers to a combination of software instances generated based on execution of certain software by hardware associated with the public cloud network. Each software instance may constitute a virtual network resource associated with the public cloud network, such as a switch, server or the like.

The term "message" generally refers to information in a prescribed format and transmitted in accordance with a suitable delivery protocol. Hence, each message may be in the form of one or more packets, frames, or any other series of bits having the prescribed format.

The term "communication link" may be construed as a logical communication path between different logic such as two or more different software instances. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 1:
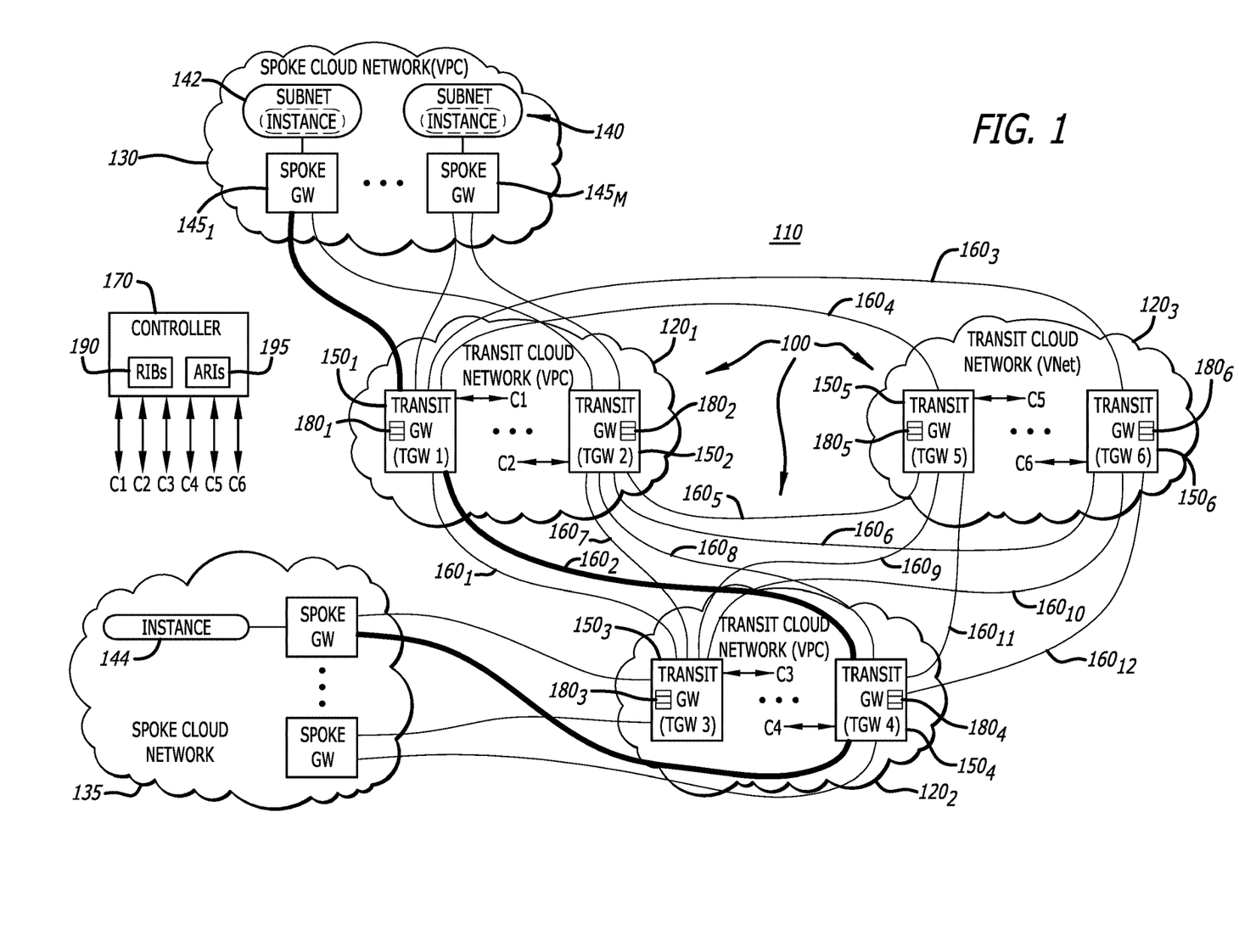
FIG. 1 is an exemplary embodiment of a multi-cloud computing platform featuring multiple virtual private cloud networks that collectively support communications between multiple instances within the same or different private cloud networks.

Referring to FIG. 1, an exemplary embodiment of a (multi-cloud) computing platform 100 featuring multiple virtual private networks, collectively supporting communications between multiple instances within the same or different private cloud networks, is shown. Herein, the computing platform 100 includes one or more transit cloud networks $120_1$-$120_N$ (N≥1; N=3) and is configured as a full-mesh network 110 with active connections between all of the gateways within the transit cloud networks $120_1$-$120_N$. Herein, each transit cloud network $120_1$ ... $120_3$ may correspond to a virtual private (cloud) network (VPC) implemented as part of Amazon® Web Services (AWS) public cloud network or as part of Google® Cloud (hereinafter, "transit VPC"), a virtual private (cloud) network (VNet) implemented as part of Microsoft® Azure® public cloud network, or the like. Herein, for clarity, the computing platform 100 will be described in accordance with a multi-cloud network (e.g., AWS™ and Azure®), although the computing platform 100 may be deployed as part of another multi-cloud network combination or may be deployed within a single public cloud network.

According to this embodiment of the disclosure, the transit cloud networks $120_1$-$120_3$ are adapted to provide reliable communications between one or more instances that may be deployed in different virtual private cloud networks and/or an on-premises network (not shown). According to this embodiment of the disclosure, the computing platform 100 is configured to mitigate disruption of communications between an instance 142 maintained as part of a first virtual private cloud network (hereinafter, "first spoke VPC") 130 and an instance 144 maintained as part of a second virtual public cloud network (hereinafter, "second spoke VPC") 135 within the computing platform 100. Herein, for this embodiment of the disclosure, the computing platform 100 features the transit cloud networks $120_1$-$120_3$ while the first spoke VPC 130, the second spoke VPC 135 along with the multiple cloud networks $120_1$-$120_N$ may formulate the construct of the full-mesh network 110. The first spoke VPC 130 and the second spoke VPC 135 may be deployed within the same public cloud network or different public cloud networks.

Referring still to FIG. 1, the first spoke VPC 130 is configured with one or more instance subnetworks 140 (hereinafter, "subnets"), where each subnet 140 includes different cloud instances such as the instance 142 being deployed within the first subnet 140. Each of the instance subnets 140 is configured, to exchange data traffic with a selected gateway of a set of (e.g., two or more) gateways $145_1$-$145_M$ (M≥2) maintained in the spoke VPC 130. Herein, these gateways $145_1$-$145_M$ are referred to as "spoke gateways" $145_1$-$145_M$. Each of the spoke gateways $145_1$-$145_M$ is communicatively coupled to a plurality of gateways $150_1$-$150_2$ within the first transit cloud network $120_1$ (referred to as "transit gateways" $150_1$-$150_2$). These transit gateways $150_1$-$150_2$, along with transit gateways $150_3$-$150_6$ from different transit cloud networks (e.g., second and third transit cloud networks $120_2$ and $120_3$) form multiple egress/ingress data paths between different spoke VPCs 130 and 135.

According to one embodiment of the disclosure, the full-mesh network 110 may be accomplished through peer-to-peer communication links 160 established between sets of transit gateways $150_1$-$150_R$ (R≥2) deployed within the different transit cloud networks $120_1$-$120_N$. For ease of illustration, the sets of transit gateways $150_1$-$150_R$ may be represented by a first set (one or more) of transit gateways $150_1$-$150_2$ associated with a first transit cloud network $120_1$, a second set of transit gateways $150_3$-$150_4$ associated with the second transit cloud network $120_2$, and a third set of transit gateways $150_5$-$150_6$ associated with the third transit cloud network $120_3$. As shown, the transit gateways $150_1$-$150_6$ are communicatively coupled to each other via peer-to-peer communication links $160_1$-$160_{12}$. The peer-to-peer communication links $160_1$-$160_{12}$ may constitute cryptographically secure tunnels, such as tunnels operating in accordance with a secure network protocol. One example of a secure network protocol may include, but is not limited or restricted to Internet Protocol Security (IPSec). Hence, these secure tunnels may be referred to as "IPSec tunnels." Also, the transit gateways $150_1$-$150_R$ may be deployed within the same public cloud network or within different public cloud networks.

It is noted that data traffic between all the spoke gateways $145_1$-$145_M$ and transit gateways $150_1$-$150_R$ are active mesh, i.e., multi-pathed. As illustrated in FIG. 1, the instance 142 send traffic to spoke gateway $145_1$, then the spoke gateway $145_1$ will forward packets to both transit gateways $150_1$ and $150_2$, to maximize throughput. Similarly, both transit gateways $150_1$ and $150_2$ send traffic to both transit gateways $150_3$ and $150_4$ through all tunnels to maximize throughput.

As further shown in FIG. 1, a controller 170 for the full-mesh network 110 is configured to manage routing of messages over the communication links $160_1$-$160_{12}$ between the transit gateways $150_1$-$150_6$ by populating routing data into gateway routing tables $180_1$-$180_R$ deployed within each of the transit gateways $150_1$-$150_R$, which is initially programmed to identify which transit gateway $150_1$ ... or $150_6$ operates as an egress resource to receive or forward one or more messages over the full-mesh network 110 directed to an instance subnet located within one of the spoke VPCs 130/135. The controller 170 is configured with access to operating states for each of the communication links $160_1$-$160_{12}$ and is configured to program and update gateway routing tables $180_1$-$180_6$ maintained for each of the transit gateways $150_1$-$150_6$, respectively.

Figure 3A:
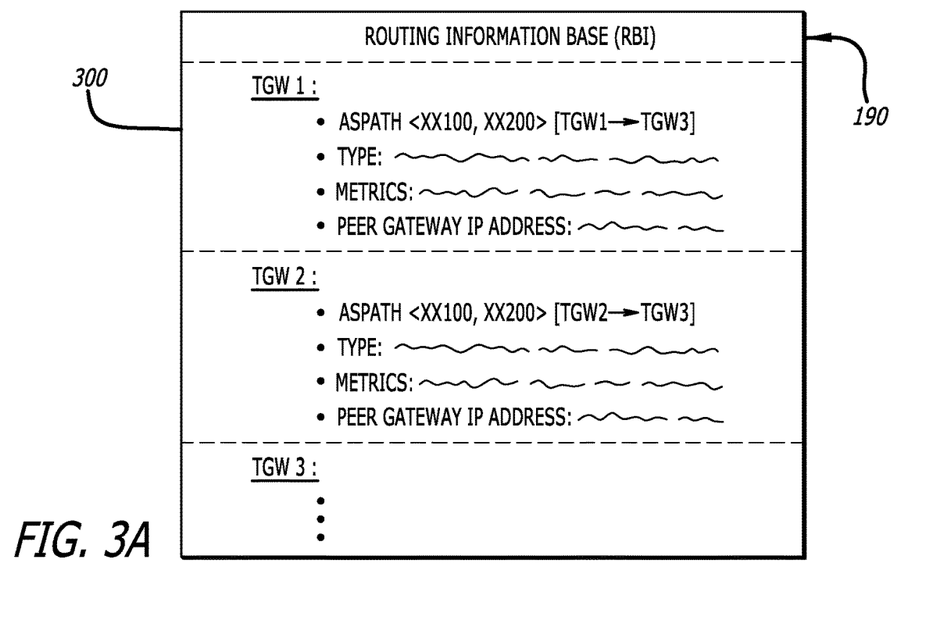
FIG. 3A is an exemplary embodiment of the routing information base of FIG. 2.
Figure 3B:
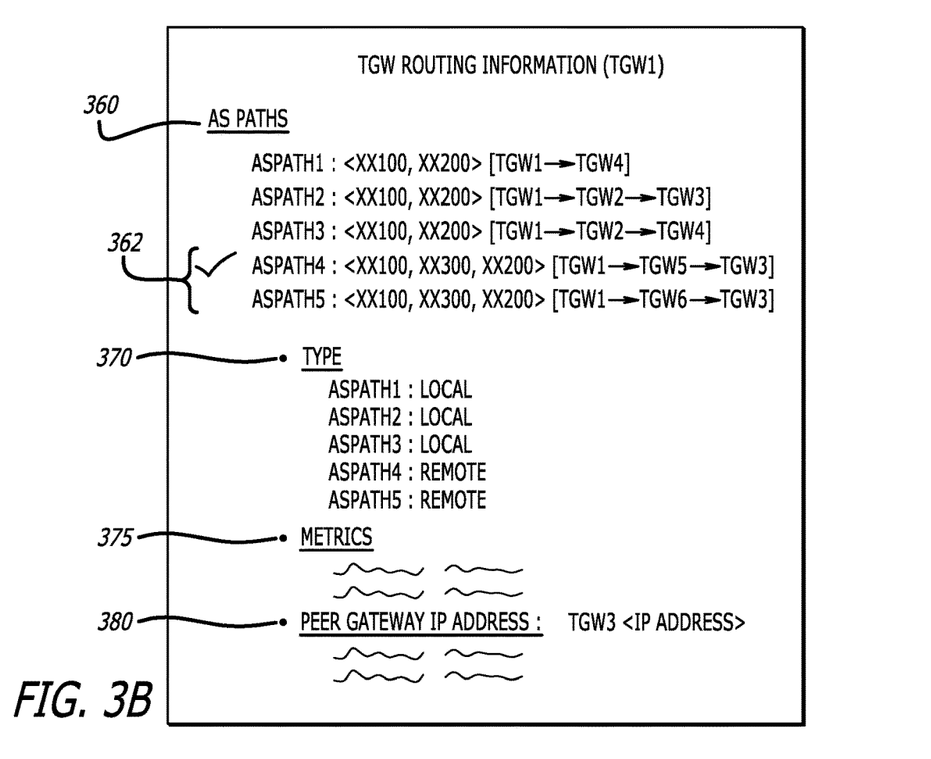
FIG. 3B is an exemplary embodiment of the alternative route information of FIG. 2.

As shown, the controller 170 includes (i) routing information bases (RIBs) 190 each including routing information associated with a different transit gateway and (ii) alternative routing information (ARI) 195 that provides additional routing information that may be relied upon to establish an alternative data path to another transit gateway in the event that the selected data path, identified within the RIB 190 for a particular transit gateway, has become disabled. As shown in FIGS. 3A-3B described below, the selected data path, as represented by autonomous system (AS) values, would be identified as the compilation of a first AS value and a second AS value.

Figure 2:
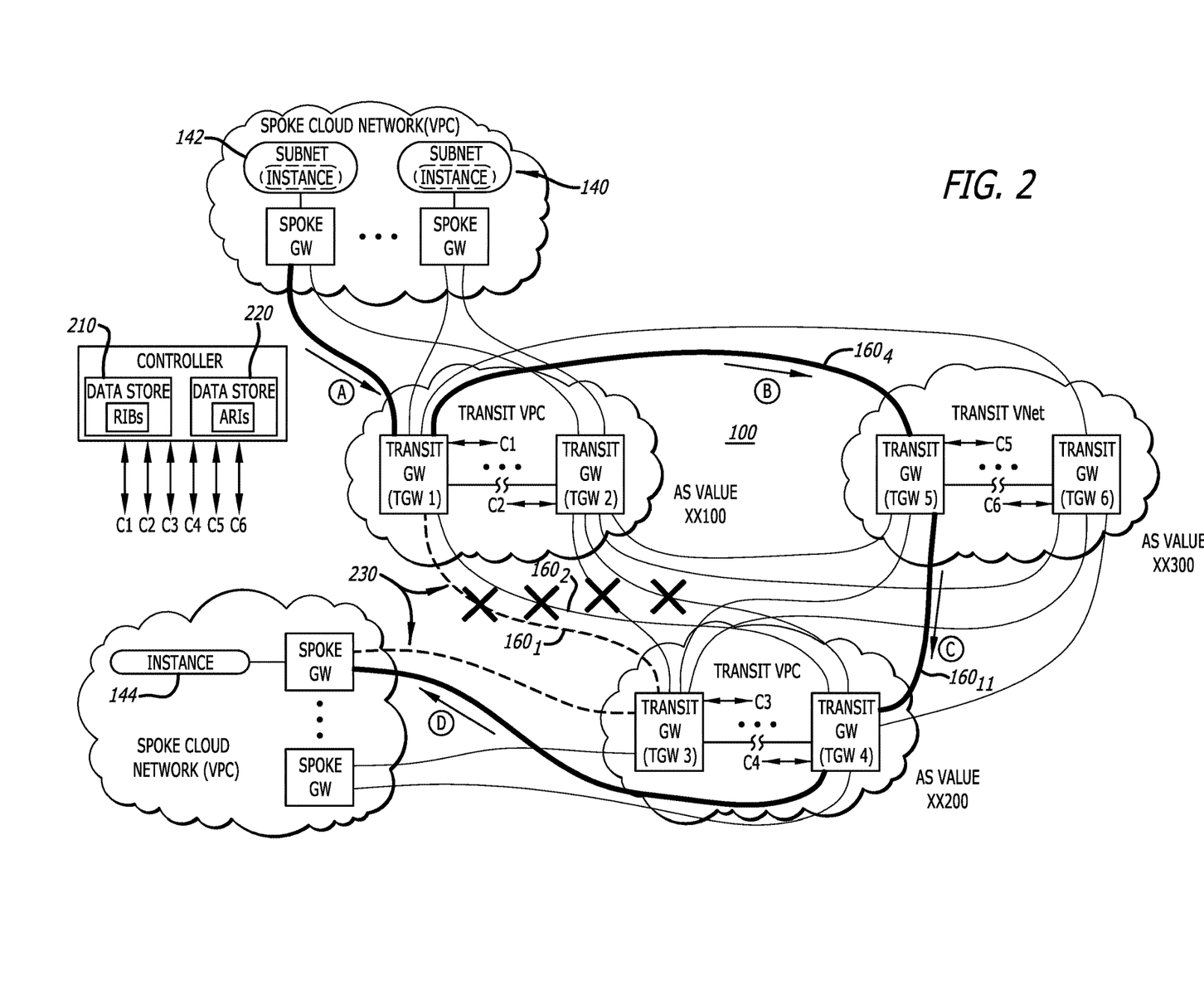
FIG. 2 is an exemplary embodiment of the multi-cloud computing platform of FIG. 1 utilizes an alternate route path between the multiple instances computed by the controller based on the alternative route information maintained for each gateway routing information base.

Referring now to FIG. 2, an exemplary embodiment of the multi-cloud computing platform 100 of FIG. 1, which utilizes an alternate route path 200, represented by flows B-D, between the multiple instances 142 and 144 based on the alternative route information maintained for each transit gateway $150_1$-$150_R$. Herein, according to one embodiment of the disclosure, the controller 170 may be configured with a first data store 210, which maintains current routing information for each of the transit gateways $150_1$-$150_6$ and operates as routing information bases (RIBs) for each of the transit gateways $150_1$-$150_6$. Additionally, the controller 170 may be configured with a second data store 220, which may be separate from or part of the first data store 210. The second data store 220 maintains alternative routing information for each of the transit gateways $150_1$-$150_6$, as shown in FIGS. 3A-3B.

It is noted that, as illustrated in FIG. 2, among communication links $160_1$, $160_2$, $160_7$, and $160_8$, if any of these communication links goes down, no best path reselection occurs if any of these communication links $160_1$, $160_2$, $160_7$, and $160_8$ is still active to transmit packets between the two transit VPCs $120_1$ and $120_2$. Only if all the communication links $160_1$, $160_2$, $160_7$, and $160_8$ are down, this communication path is not available anymore. Therefore, the controller 170 starts to reselect the best path.

For instance, as shown in FIG. 3A, a routing information base (RIB) 300 for the first transit gateway $150_1$ may include a series of pointers 310, which represent a best route path 230 illustrated by dashed arrows along communication link $160_1$ in FIG. 2. The best route path 230 includes information that identifies the intermediary transit gateways utilized to route a message transmitted from a source transit gateway $150_1$ to a destination transit gateway $150_3$.

Referring to FIGS. 2 & 3A, the series of pointers 310 may correspond to one or more AS values in the aggregate (i.e., AS path), where each AS value is uniquely assigned to a particular transit cloud network. The destination transit gateway $150_3$ of FIGS. 1-2 may be represented by an Internet Protocol (IP) address, which may be stored within the RIB 300 for the first transit gateway $150_1$ along with the AS path 310. The IP address may be a private IP address associated with the destination transit gateway $150_3$ or a public IP address. The destination transit gateway $150_3$ constitutes the transit gateway along the best route path 230 that is communicatively coupled to a spoke cloud network (e.g., spoke VPC 135) or on-premises network including the second instance 144 intended as a recipient of the message.

Additionally, as shown in FIGS. 2 & 3B, the controller 170 conducts analytics of the alternative routing information 350 in response to failure of communication link $160_1$ between transit cloud networks $120_1$ and $120_2$, where the transit gateways $150_1$ and $150_3$ are part of the best route path 230. The alternative routing information 350 for each transit gateway (e.g., transit gateway $150_1$) may include, but it is not limited or restricted to the following: (i) one or more AS paths 360 along with their path types 365 (e.g., local within the same transit cloud network, etc.), (ii) type 370, (ii) information metrics 375 and (iii) a peer gateway IP address 380 that identifies the destination transit gateway for each of the AS path(s) 360.

The analytics and selection of an alternative route to operate (at least temporarily) as the best route path may be initially dependent on the number of hops associated with each of the AS path(s) 360. One of the AS path(s) 360 with the least number of hops is selected as the new best route path, where a routing within the same transit cloud network (e.g., same transit VPC such as routing from transit gateway $150_1$ to transit gateway $150_2$) does not constitute a "hop" as the same AS value is retained. As shown, given that communication links $160_1$-$160_2$ and $160_7$-$160_8$ have failed, the available AS paths 362 (ASPath 4/5) feature at least two hops. Herein, for the AS paths 362, the type is "remote," identifying that the routing would need to occur via gateway (s) deployed within another public cloud network.

The information metrics 375 are analyzed by the controller 170 in response to the controller 170 determining that the best route path 230 has failed and multiple available AS paths 362, which are considered to be elevated as the best route path 230, are equivalent based on the same number of hops (transit gateways) between transit gateways to route a message from one instance to another. Herein, according to one embodiment of the disclosure, the information metrics 375 associated with each AS path 360 may include, but are not limited or restricted to (a) link parameter metrics 376 (e.g., metrics identifying preferences between links to a neighboring transit gateway along the alternate route path); (b) security metrics 377 (e.g., lower values assigned to encrypted links, certain security protocols over others, retention with the public cloud versus transmission over the Internet, etc.); (c) metrics 378 directed to the work load supported by the AS path; and/or (d) factors 379 associated with an IP address associated with a source transit gateway or transit gateway neighboring the source transit gateway (hereinafter, "neighboring IP address") that, if other metrics are the same, prompt selection of one of the available AS paths 362. For instance, the neighboring IP address factors 379 may include selection of the neighboring IP address with the lowest IP address value, the neighboring IP address with the highest IP address value, the neighboring IP address with a lowest or highest bit value for a prescribed portion of the neighboring IP address, or the like.

Referring back to FIG. 2, the controller 170 is configured to monitor routing operability between the transit cloud networks $120_1$-$120_N$ (e.g., transit VPCs $120_1$-$120_2$) reserved and utilized by a particular user, and thus, the controller 170 is configured to detect when a communication link (e.g., IPSec tunnel $160_1$) fails and updates the RIBs 190 (and corresponding routing gateway tables $180_1$-$180_6$) associated with transit gateways $150_1$ and $150_3$ that are part of the failed IPSec tunnel $160_1$. The updating of the RIBs 190 may include (i) disabling (bring down) a tunnel interface (e.g., virtual tunnel interface "VTI") corresponding to the failed IPSec tunnel $160_1$ and (ii) selecting other IPSec tunnel(s) $160_4$ and $160_{11}$ to handle such communications. By disabling the VTI associated with the failed IPSec tunnel $160_1$, further data transmissions over the failed IPSec tunnel $160_1$ are prevented to mitigate data transmission loss. Instead, the messages are routed through a selected active IPSec tunnel. The disabling of the VTI may be conducted by the controller 170, or in the alternative, by the transit gateway $150_1$ without further operability by the controller 170.

In response to alteration of the fourth AS path (ASPath 4) as the best route path 230, the best route path 230 now transverses through (i) the first transit gateway $150_1$ from the first spoke VPC 130 including the source instance 144, (ii) the fifth transit gateway $150_5$ from the first transit gateway $150_1$ via communication link $160_4$, (iii) the fourth transit gateway $150_4$ from the fifth transit gateway $150_5$ via communication link $160_{11}$, and to the second spoke VPC 135 including the destination instance 144. If one of the failed communication links (IPSec tunnel) becomes operational again (i.e., the IPSec tunnel $160_1$ or $160_2$ becomes active), the controller 170 and/or transit gateway $150_1$ will detect the change in operation and enable the VTI associated with the IPSec tunnel $160_1$ or $160_2$. This operational AS path may be initially categorized as an alternate route path awaiting the controller 170 to re-evaluating the route paths to potentially elevate the route path given the lesser number of hops required for routing of a message from the first spoke VPC 130 to the second spoke VPC 135.

Figure 4:
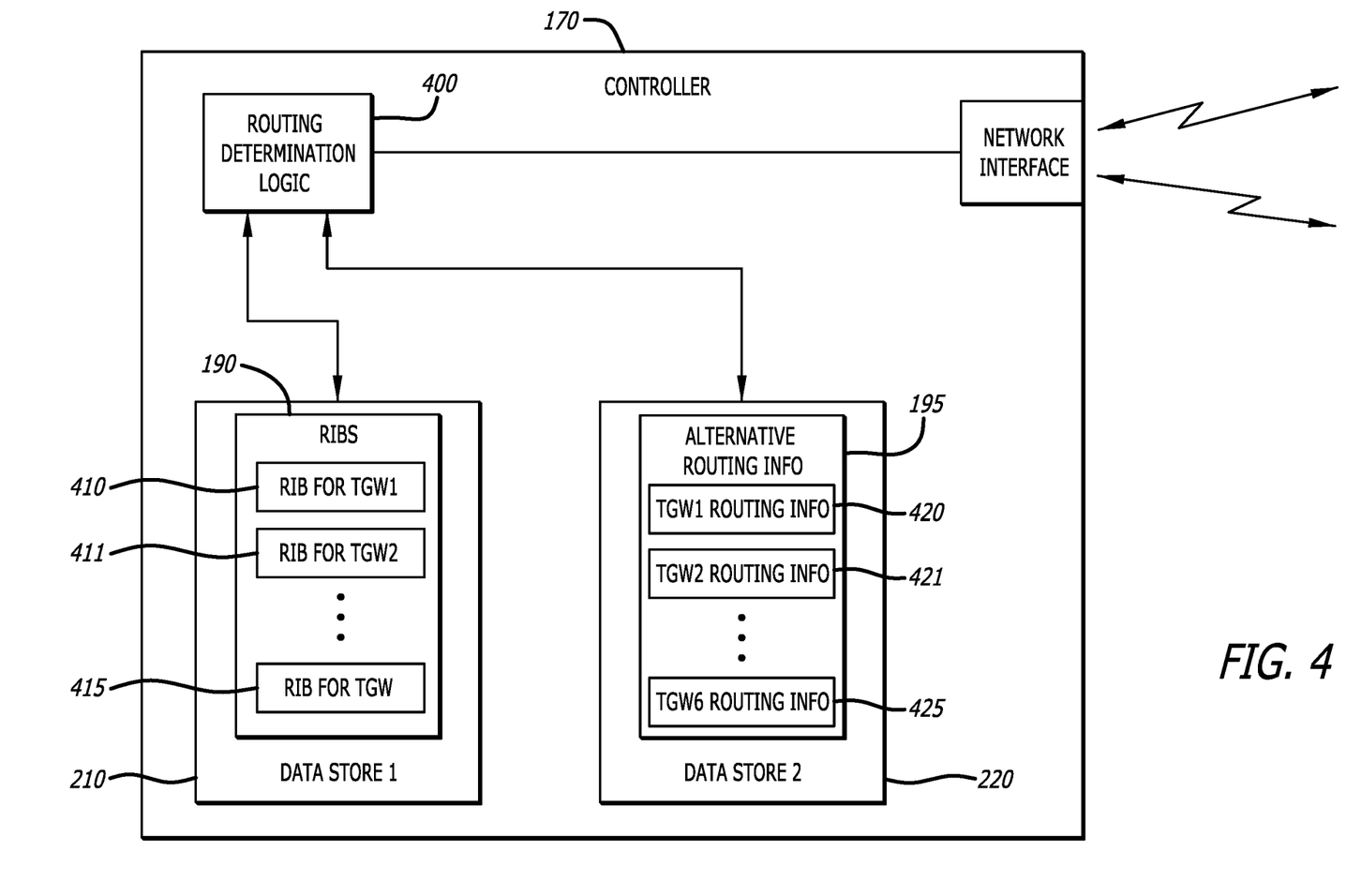
FIG. 4 is an exemplary illustration of a logical representation of the controller of FIGS. 1-2 that controls the content maintained within the routing information bases (RIBs) for each transit gateway and the alternative route information for each of the transit gateways of FIGS. 1-2.

Referring to FIG. 4, an exemplary illustration of a logical representation of the controller 170 of FIGS. 1-2 that controls the content maintained within the RIBs 190 for each transit gateway $150_1$-$150_6$ and the alternative route information 195 for each of the transit gateways $150_1$-$150_6$ of FIGS. 1-2. Herein, the controller 170 includes route determination logic 400, namely logic operating in accordance with Border Gateway Protocol (BGP). The route determination logic 400 of the controller 170 is responsible for (i) conducting analytics on all available AS paths for a message intended to be sent from the first transit gateway $150_1$ within the first transit cloud network $120_1$ to the third transit gateway $150_3$ within the neighboring transit cloud network $120_2$ (see FIG. 1) and (ii) selecting a best route path for that message. These transit gateways $150_1$ and $150_3$ may correspond to the source transit gateway within the first transit cloud network $120_1$ and the destination transit gateway within the second transit cloud network $120_2$. These transit cloud networks $120_1$-$120_2$ may reside within the same public cloud network or different public cloud networks.

According to one embodiment of the disclosure, the route determination logic 400 is provided access to content within the first data store 210 and the second data store 220. The first data store 210 includes the RIBs 190, namely RIBs 410-415 for each of the transit gateways $150_1$-$150_6$, as shown in FIG. 3A and discussed above. The second data store 220 includes the alternative routing information 195, namely alternative routing information 420-425 for each of the transit gateways $150_1$-$150_6$, as shown in FIG. 3B and discussed above. The routing determination logic 400 conducts the analytics to elevate an alternate route path as the best route path.

III. Operational Flow

Figure 5A:
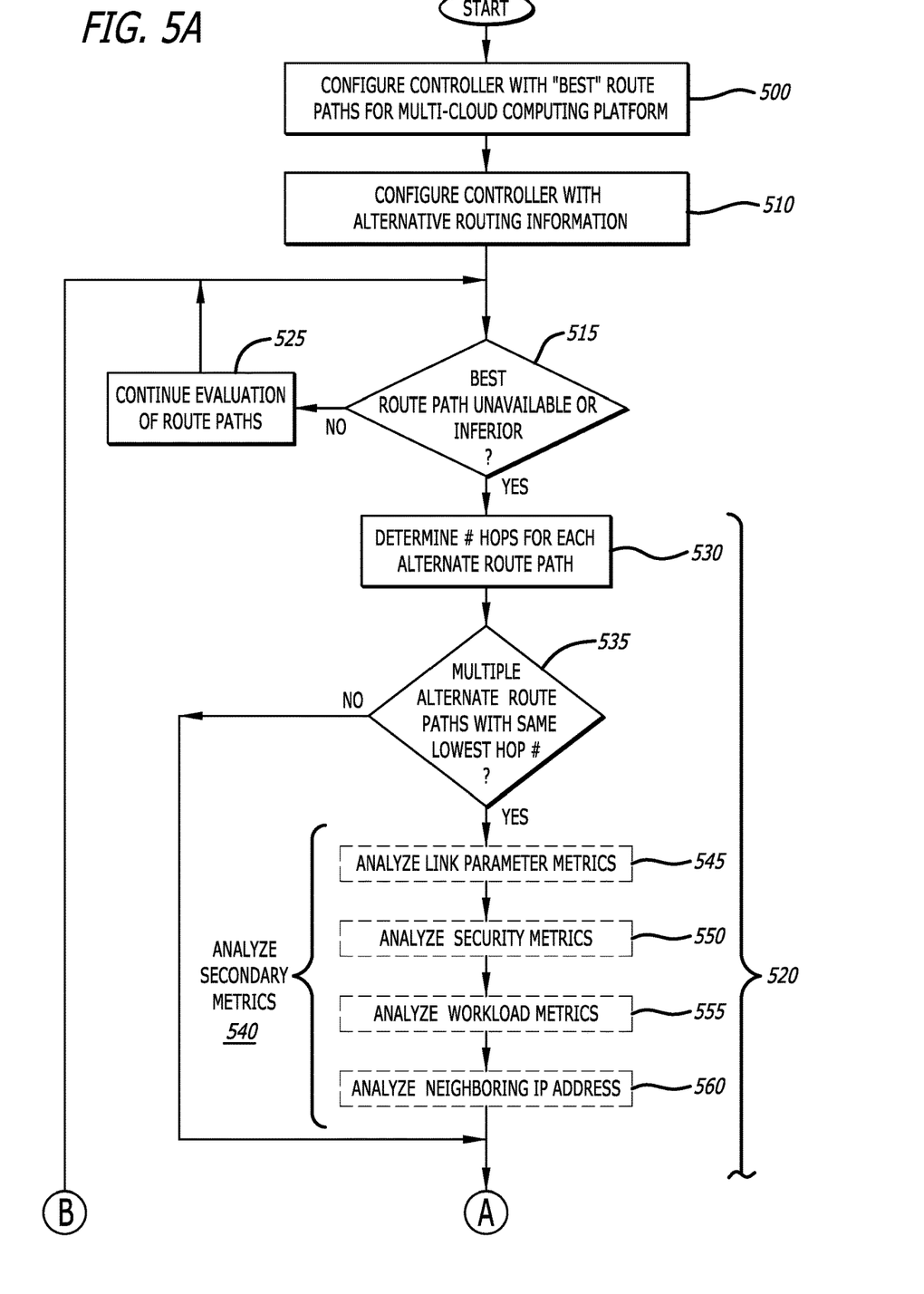
FIGS. 5A-5B are a flowchart of an exemplary embodiment of a transit gateway deployed within any virtual private cloud network of FIGS. 1-2.
Figure 5B:
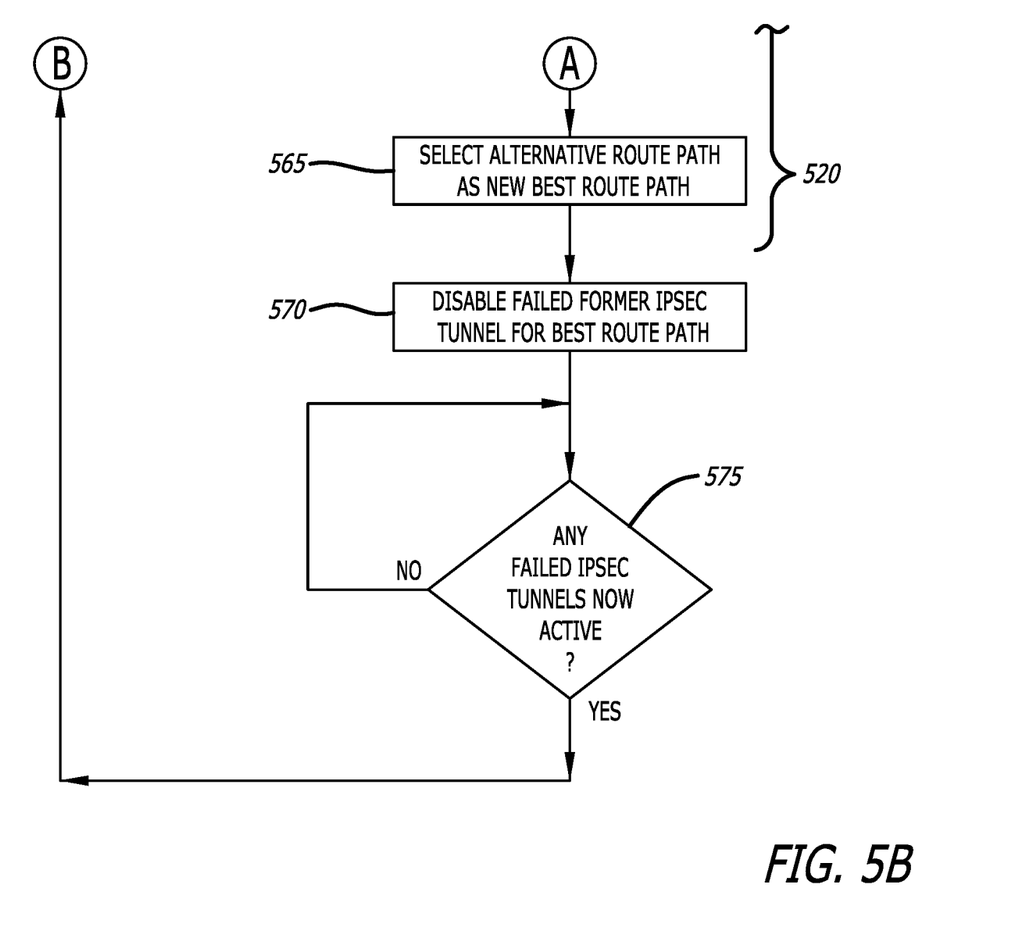

Referring now to FIGS. 5A-5B, a flowchart of an exemplary embodiment of operations of a controller for altering the routing of messages through a matrix of transit gateways deployed within different transit cloud networks is shown. Herein, according to one embodiment of the disclosure, the controller is configured to determine and maintain the "best" route paths between different transit gateways within the multi-cloud computing platform (operation 500). Additionally, the controller is configured to generate alternate route paths based on alternative routing information maintained by the controller (operation 510). More specifically, the controller includes route determination logic, operating in accordance with Border Gateway Protocol (BGP), which conducts analytics on all available route paths between transit gateways within neighboring transit cloud networks interposed between communicative cloud instances within different spoke VPCs. From the analytics, the best route path and one or more alternate route paths may be determined.

Herein, according to one embodiment of the disclosure, the best route path may constitute the optimal sequence of transit gateways as referenced by an aggregate of unique AS values assigned to a particular transit cloud network hosting a transit gateway. The alternate route path(s) identify the remaining route paths available to a source cloud instance attempting to communicate with a destination cloud instance. The best route paths provided by transit cloud networks between different spoke VPCs are retained as the RIB within a first data store maintained by the controller while the alternative routing information for each transit gateway is retained within a second data store retained by the controller.

Whether a route path constitutes the "best" route path may be based, at least in part, on the least number of hops (transit cloud networks) through which the message is routed and secondary metrics, which may include (i) information metrics and (ii) a peer gateway IP address that identifies the destination transit gateway for the alternate route path. Herein, the information metrics associated with each alternate route path may include, but are not limited or restricted to link parameter metrics, security metrics, metrics directed to the work load supported by the particular AS path; and/or factors associated with the neighboring IP address.

Responsive to the controller detecting that a best route path is unavailable or is inferior to one of the alternate route paths (e.g., gateway failure, gateway maintenance, less than optimal), the controller selects an alternate route path to operate as a substitute for the best route path (operations 515 and 520). Otherwise, the controller continues to evaluate to determine if any of the current best route paths should be substituted for a pending alternate route path (operation 525). The selection of the route path may involve analysis of the number of hops (e.g., AS values representative of transit cloud networks operating as intermediaries for data flows) and selection of a substitute best route path from one or more route paths with the least number of hops (operation 530).

As an illustrative example, where the best route path has become unavailable and multiple alternate route paths (considered for elevation as the best route path) are equivalent based on the same number of hops (transit gateways) between the source transit gateway and the destination transit gateway that support communications between cloud instances in different spoke VPCs, the secondary metrics are analyzed by the controller (operations 535 and 540) with the lowest (or highest) values (or aggregate of values) identifying the new best route path. As illustrated, the secondary metrics may include assigning lower (or higher) values (e.g., weight or preference) to certain links between neighboring transit gateways based on link characteristics, such as throughput, transfer rates, geographic location (compliance with country laws and/or speed) or the like (operation 545). Additionally, or in the alternative, the secondary metrics may include security metrics with lower (or higher) values to encrypted links, the usage of certain security protocols over others, and/or retention of the data transfer within the public cloud versus transmission over the Internet (operation 550). Additionally, or in the alternative, the secondary metrics may include work load metrics that assign values based on the current workload of each neighboring transit gateway for the AS path (operation 555). Lastly, the secondary metrics may include other factors such selection of the neighboring (source) transit gateway of the AS path with the lowest (or highest) IP address (operation 560). Based on these analytics, a selected alternate route path is elevated as the new "best" route path (operation 565)

Additionally, the controller may be configured to disable (bring down) a tunnel interface (e.g., virtual tunnel interface) corresponding to the unavailable path (e.g., failed IPSec tunnel) by disabling the VTI associated with the failed IPSec tunnel (operation 570). The disabling of the VTI may be conducted by the controller, or in the alternative, by the transit gateway without further operability by the controller.

Similarly, in response to the unavailable IPSec tunnel (or any unavailable or failed IPSec tunnels) becoming operational again (i.e., the IPSec tunnel becomes active so that the former best route path is available), the controller and/or transit gateway will detect the return of the tunnel interface corresponding to the newly operational IPSec tunnel and may conduct the operations set forth in operations 515-560 where the former best route path is now one of the alternate route paths (operation 575).

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A non-transitory storage medium comprising a controller deployed as a software component maintained within a non-transitory storage medium, the controller comprising:

a first data store configured to store current routing information from a source transit gateway within at least a first transit cloud network of a cloud network to a destination transit gateway of the plurality of transit gateways within at least a second transit cloud network of the cloud network, each of the source transit gateway and the destination transit gateway being one of a plurality of transit gateways associated with the cloud network;

a second data store configured to store alternative routing information between the source transit gateway to the destination transit gateway; and route determination logic configured to (i) periodically conduct analytics on all available route paths for a message intended to be sent from the source transit gateway to the destination transit gateway, (ii) select a best route path for the message based upon the analytics, (iii) create, for the selected best route path for the message, a series of pointers that represent intermediary transit gateways of the plurality of transit gateways and their routing order, (iv) determine, via the periodically conducted analytics, if an IPSec tunnel has failed; (v) disable a virtual tunnel interface associated with the failed IPSec tunnel, (v) determine, via the periodically conducted analytics, if the failed IPSec tunnel becomes operational again; and (vi) reactivate the virtual tunnel interface when the failed IPSec tunnel becomes operational again.

2. The controller of claim 1, wherein the best route path constitutes an optimal sequence of transit gateways of the plurality of transit gateways that support a transmission of data traffic between a source cloud instance communicatively coupled to the source transit gateway to a destination cloud instance communicatively coupled to the destination transit gateway.

3. The controller of claim 2, wherein the cloud network corresponds to a multi-cloud network comprises one or more virtual private cloud networks associated with a first public cloud network and one or more virtual private cloud networks associated with a second public cloud network.

4. The controller of claim 1, wherein each of the available route paths includes a series of pointers that represent each of the transit gateways for routing the message from the source transit gateway to the destination transit gateway.

5. The controller of claim 4, wherein each of the series of pointers correspond to an autonomous system (AS) value.

6. The controller of claim 1, wherein the alternative routing information comprises one or more route paths including a series of autonomous system (AS) values.

7. The controller of claim 6, wherein the alternative routing information further comprises information metrics associated with each of the one or more route paths, the information metrics include (a) metrics directed to link parameters, (b) metrics directed to security, and (c) metrics directed to a work load supported by an alternate route path of the one or more route path, and the information metrics being used to determine an alternative route path as the best route path in response to a failure of communication links between the first transit cloud network and the second transit cloud network.

8. The controller of claim 7, wherein the information metric further comprises an Internet Protocol (IP) address for a neighboring transit gateway of the source transit gateway.

9. The controller of claim 1, wherein the route determination logic is further configured to enable the tunnel interface corresponding to the failure of communication links upon a determination that the failure of communication links becomes operational.

10. The method of claim 1, further comprising enabling the tunnel interface corresponding to the unavailable best route path upon a determination that the unavailable best route path becomes operational.

11. A method, comprising:
  determining whether a best route path between a source transit gateway of a first transit cloud network and a destination transit gateway of a second transit cloud network is unavailable;
  responsive to determining that the best route path is unavailable, conducting analytics of a first metrics for each alternative route path of a plurality of alternative route paths;
  responsive to two or more alternative route paths of the plurality of alternative route paths including equivalent metrics, periodically conducting analytics of secondary metrics for each alternative route path of the plurality of alternative route paths to determine a selected alternative route path of the plurality of alternative route paths as the best route path;
  creating, for the selected alternative route path, a series of pointers that represent intermediary transit gateways of the plurality of transit gateways and their routing order;
  determining, via the periodically conducted analytics, if a virtual tunnel interface has failed;
  responsive to a determination that the virtual tunnel interface has failed, disabling the virtual tunnel interface to mitigate data transmission loss;
  determining, via the periodically conducted analytics, if the failed virtual tunnel interface becomes operational again; and
  and reactivating the failed virtual tunnel interface when the failed virtual tunnel interface becomes operational again.

12. The method of claim 11, wherein the first metrics include a determination of a number of hops for each alternative route path of the plurality of alternative route paths.

13. The method of claim 12, wherein the best route path is unavailable based on a failure of all communication links between the first transit cloud network and the second transit cloud network.

14. The method of claim 13, wherein the analytics of the secondary metrics is conducted in response to two or more alternative route paths of the plurality of alternative route paths having the same number of hops.

15. The method of claim 14, wherein the conducting of the analytics of the secondary metrics comprises analytics of link parameter metrics being metrics identifying preferences between communication links from the source transit gateway to a neighboring transit gateway associated with each of the two or more alternate route paths.

16. The method of claim 14, wherein the conducting of the analytics of the secondary metrics comprises analytics of security metrics where a preferred value is assigned to an encrypted communication link of the communication links or a preferred value is assigned to a communication link of the communication links operating in accordance with a certain security protocol.

17. The method of claim 14, wherein the conducting of the analytics of the secondary metrics comprises analytics of workload associated with a neighboring transit gateway for each of the two or more alternative route paths.

18. The method of claim 14, wherein the secondary metrics further includes selection of a neighboring transit gateway of the two or more alternative route paths with a lowest Internet Protocol (IP) address.

19. The method of claim 14, wherein the secondary metrics further includes selection of a neighboring transit gateway of the two or more alternative route paths with a highest Internet Protocol (IP) address.

* * * * *